United States Patent [19]

Perner

[11] Patent Number: 5,765,881
[45] Date of Patent: Jun. 16, 1998

[54] INTERLOCKING SPLIT FLANGE CONNECTOR

[76] Inventor: Guenther H. Perner, P.O. Box 168, Hancock, N.H. 03449

[21] Appl. No.: 701,064

[22] Filed: Aug. 21, 1996

[51] Int. Cl.$^6$ .................................................. F16L 23/032
[52] U.S. Cl. ............................................ 285/415; 285/906
[58] Field of Search ................................. 285/414, 415, 285/906

[56] References Cited

U.S. PATENT DOCUMENTS

| | | | |
|---|---|---|---|
| 776,971 | 12/1904 | Walsh | 285/414 X |
| 1,784,667 | 12/1930 | Gillet | 285/415 X |
| 2,764,431 | 9/1956 | Wilde | 285/415 |
| 2,911,239 | 11/1959 | Marzolf | 285/415 |
| 3,942,141 | 3/1976 | Kaffenberger | 285/414 X |
| 5,314,215 | 5/1994 | Weinhold | 285/415 X |

FOREIGN PATENT DOCUMENTS 6709 of 1886 United Kingdom .................. 285/414

*Primary Examiner*—Dave W. Arola
*Attorney, Agent, or Firm*—George W. Dishong

[57] ABSTRACT

An interlocking split flange connector, with two or three bolt holes, for attaching two pipes or other conduit at attachable and mateable flanged conduit ends such as found in vehicle exhaust systems. Because of the interlocking and split characteristics of the connector it is not necessary to slip the connector over the conduit and can thus be used with the disassembly of parts which may be attached to the conduit ends. The connector is formed from the interlocking assembly of two substantially identical interlocking split members. Each of the assembled interlocking split members has a centrally located aperture and at least two bolt holes or fastening apertures, a first symmetry axis and a second symmetry axis perpendicular to the first symmetry axis. The central aperture is formed by a semicircular inner edge and two substantially straight interlocking edges. The central aperture is preferably symmetric about the first symmetry axis but alternatively may be symmetric about the second symmetry axis. Additionally, each of two substantially identical clamp members has an interlocking portion affixed to the first interlocking split member such that the interlocking portion of the first interlocking split member, when the two interlocking split members are assembled, interfits between the interlocking edges of the second interlocking split member. The interlocking portion may be preferably created from a removed portion of the material of the identical interlocking split member. The interlocking assembly of the two substantially identical interlocking split members creates the interlocking split flange connector having the central aperture and fastening apertures.

11 Claims, 6 Drawing Sheets

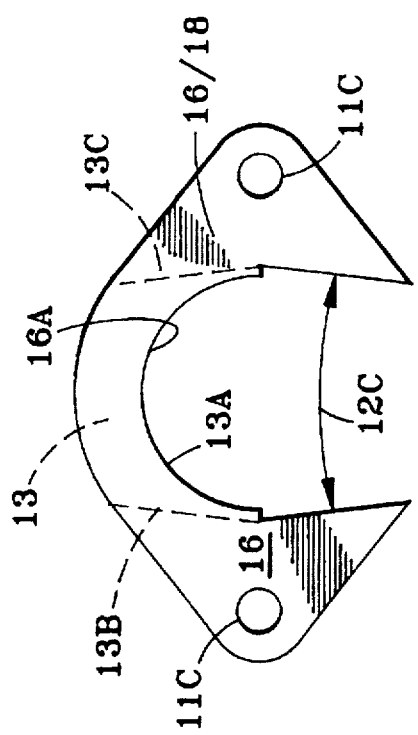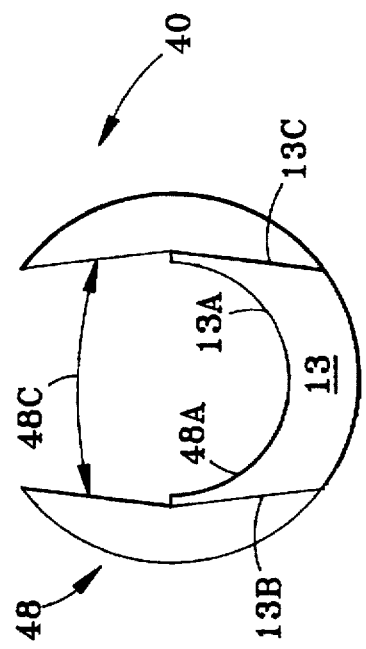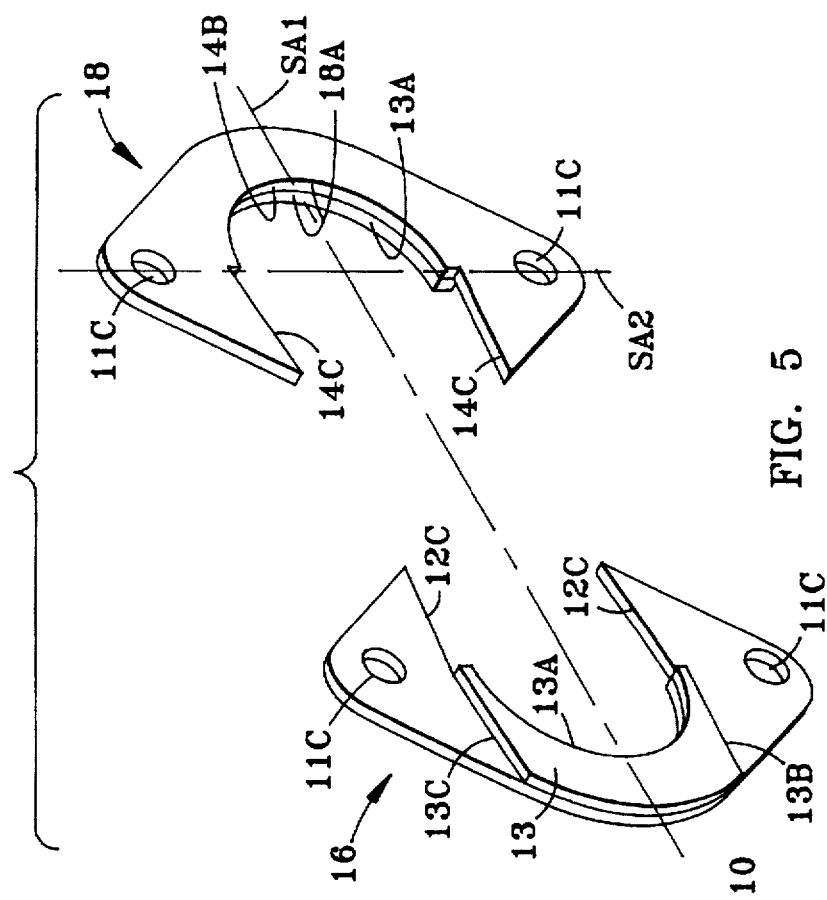

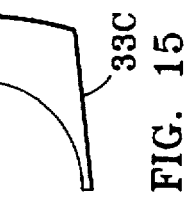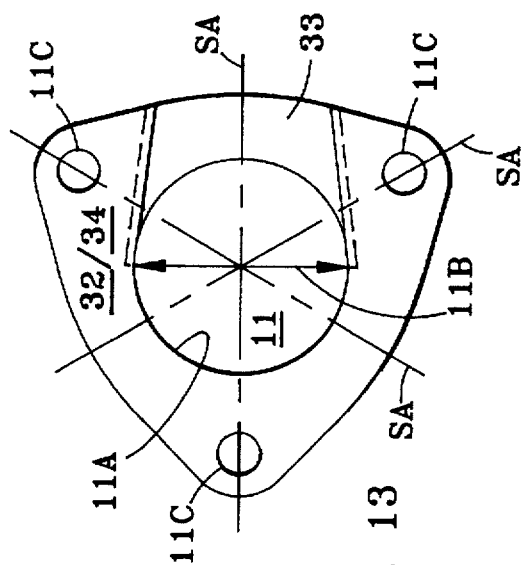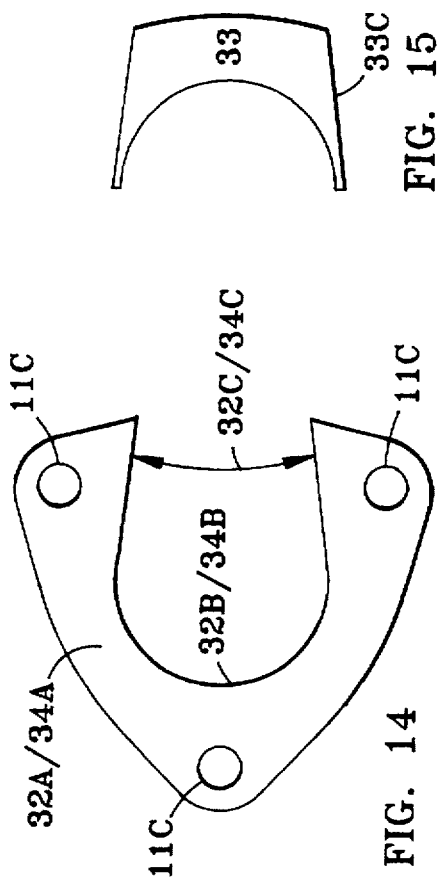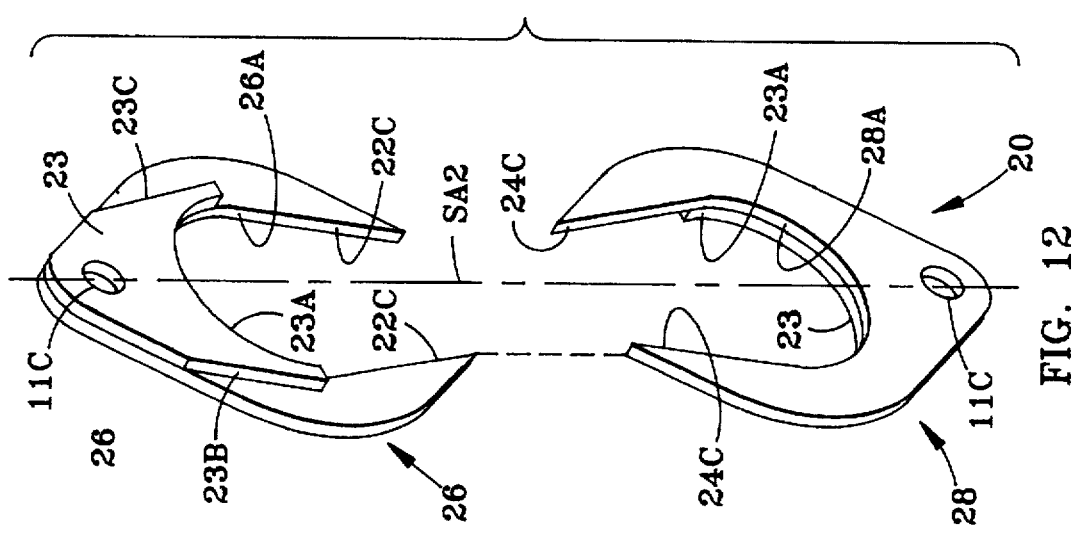

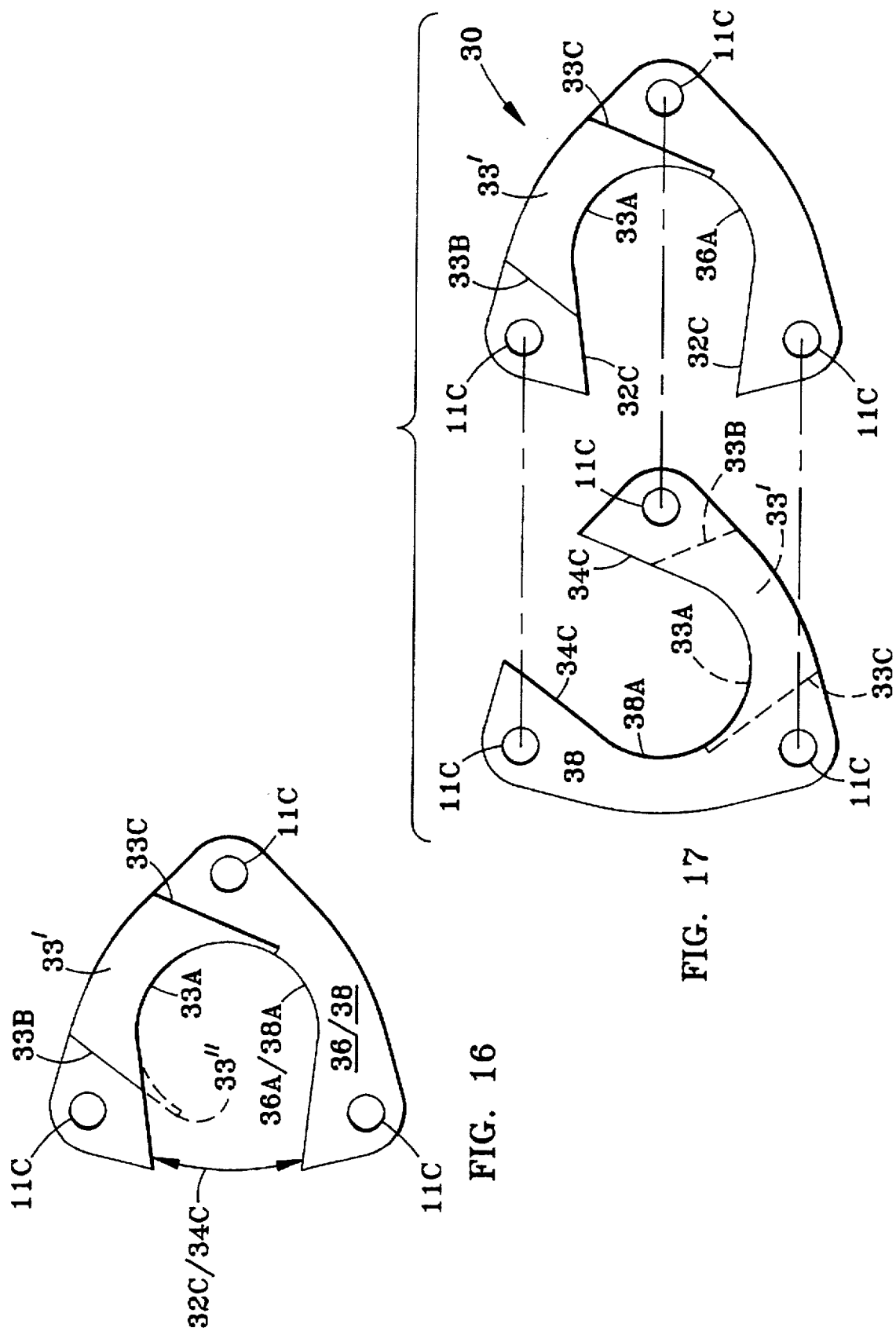

1
INTERLOCKING SPLIT FLANGE CONNECTOR

BACKGROUND OF THE INVENTION

1. Field of the Invention

This invention most generally relates to a device designed to be applied on a conduit or a pipe without the need to "slip" it over an end of the conduit. More particularly, the device is designed to be applied on an exhaust pipe without disassembling the pipe from the exhaust system.

2. Description of the Prior Art

Whenever a flange clamp/connector fails, for one reason or another, it becomes necessary for the piping to be separated so one end is free and small enough for a replacement flange to be slipped onto it. This is caused by the simple fact that the flange clamp or connector is made in one flat piece with a hole through the center. The only way it can be placed onto the pipe is to slip it over an open end. This is tue whether the flange is of the screwed on, welded on, or slipped on variety.

A common application for flange clamps is on automotive exhaust systems where welded flange clamps with companion flange clamps which are of the slip-on variety. These clamps are used with flared or flanged ends on the pipes. As a result when a flange clamp fails, even though it is a very inexpensive item, the replacement of it is costly. Usually it is necessary to remove an entire section of the exhaust system and in the removing of such section, it is often necessary to replace the section due to damage as a consequence of removal.

It is therefore desirable to have an effective, simple, easy to use, reasonably priced split flange clamp or connector which can be used to join flared or flanged end conduit in flow connection without the need to remove good sections attached to the conduit and which may be used in combination with flange clamps which are a permanent part of the piping of the exhaust system. None of the flange clamp devices known by the inventor hereof provide the performance, economics and advantages of the present interlocking split flange connector disclosed herein.

The following patents relate to the technology of the present invention, but none of them meets the objects of the presently disclosed and claimed invention. Additionally, none are as effective and as efficient as the instant interlocking split flange connector.

U.S. Pat. No. 4,643,458, issued Feb. 17, 1987, for a "Support and Clamping Assembly" discloses a:

"A support and clamping assembly has two brackets. A first bracket is adapted to be mounted around the outlet of a catalytic converter. It is capable of replacing an original mounting flange, and includes two bracket members which can be sicured behing a wel bead of the original flange. To suppor the catalytic converter, this first bracket is attached to support straps. A second bracket is mounted on the flared end of a muffler tail pipe, and studs or bolts connect the two brackets together to secure the muffler pipe to the converter. The second bracket comprises third and fourthe bracket members, and the studs securing it to the first bracket also serve to hold these two bracket members together."
U.S. Pat. No. 4,660,266, to Horn, issued Apr. 28, 1987, for a "Split Flange Connector And Method Of Making Same" discloses a:

"A split-flange connector is made by first rolling a strand of steel into an elongated bar having a rolled planar face formed centrally with a semicylindrical groove extending parallel to the face. This bar is then cut perpendicularly to the face into at least two identical sections of a predetermined length. At least one bore offset from and parallel to the groove is drilled through each bar section. The two sections are clipped together with the faces abutting flatly and the grooves forming a cylindrical passage." U.S. Pat. No. 4,730,852, to Arscott, issued Mar. 15, 1988, for a "Vehicle Exhaust Repair Device" discloses a:

"The invention is a device for repairing a defective exhaust system of a vehicle. Some types of catalytic converters have an integral collar to hold the converter to the vehicle. Failure of the collar due to corrosion and other factors results in the converter being only partially supported by the vehicle and may also result in a poor connection with the rest of the exhaust system. The device of the invention acts both to vertically support the converter of the vehicle and to secure the converter to the rest of the exhaust system." U.S. Pat. No. 4,519,639, assigned to Nickson Industries, for a "Hinged Flange For Tailpipes And The Like" discloses a:

"A split flange for coupling flanged pipes of an exhaust system of the like includes a pair of laminated clamp members of arcuate configuration each comprised of at least three sheet metal arcuate segmeents which are staggered in overlying relationship so as to provide end portions in which laminae are spaced apart. The end portions of the two clamp members are interfitted and are provided with aligned apertures through which fasteners extend for assembly of the tow clamp members and with an associated clamping element to clamp the flanged pipes together." U.S. Pat. No. 5,073,353, assigned to Nickson Industries, for a "Catalytic Converter Front Flange And Method Of Making Same" discloses a:

"A replacement flange for the end of a catalytic converter is provided by a pair of generally L-shaped coupling elements which have their base portions opposed and seated in an elongated channel element which permits one coupling element to slide therein relative to the other. The opposed edges of the flange coupling elements are generally arcuate to fit about the end pipe of the converter and have recesses to seat the flanges on the sides of the converter body. Assembly is effected by mounting one coupling element to the automobile support structure about the converter end and then sliding the other coupling element sideways into engagement therewith and mounting it to the support structure."

The patents noted herein provide considerable information regarding the developments that have taken place in this field of technology. Clearly, the present invention provides many advantages over the inventions noted above. Again it is noted that none of the inventions listed above provides for the split flange connector which is also interlocking and which interlocking split flange connector is created by two substantially identical members. As such, none is as simple, effective or efficient as the present invention.

SUMMARY OF THE INVENTION

This invention most generally relates to a two part assembleable connector device which may be used to connect conduit in flow connection from a first conduit to a second conduit without having to slide the connector device onto the conduit from one or the other of the ends of the conduit. More particularly the invention relates to an interlocking split flange connector, with two or three bolt holes, for attaching two pipes at attachable and mateable flanged conduit ends such as found in vehicle exhaust systems. Preferably, the connector is formed from the interlocking assembly of two substantially identical interlocking split members though the split members need not be identical. Additionally, each of two interlocking split members has an interlocking portion affixed thereto such that the interlocking portion of the first interlocking split member, when the two interlocking split members are assembled, interfits between the interlocking edges of the second interlocking split member. The interlocking portion may be preferably created from a removed portion of the material of the identical interlocking split member. The interlocking assembly of the two substantially identical interlocking split members creates the interlocking split flange connector having the central aperture and fastening apertures.

A basic object of the present invention is to provide a clamping device which is useful in the connection, in a flow connecting manner, two conduit ends without the need to slip the connector/clamp device onto the conduit from an end thereof.

An object of the present invention is to provide a clamping device that is easy to use and works in a manner familiar to those who repair vehicle exhaust systems.

Another object of the present invention is to provide an interlocking split flange connector which is formed by the interlocking assembly of two substantially identical interlocking split members each of which has an interlocking portion which is created from and substantially identical to a removed portion from each of two identical members. The removed portion, becoming the interlocking portion has substantially the same peripheral geometry as the walls which define the aperature created by the remove portion.

It is a primary object of the present invention to provide an interlocking split flange connector for attaching two conduit at attachable and mateable flanged conduit ends comprising a first interlocking split member and a second interlocking split member. Each of the first and second interlocking split members comprises a first symmetry axis and a second symmetry axis perpendicular to the first symmetry axis; an inner wall means defining substantially about one half of a perimeter of a central aperture. The central aperture is formed upon interlocking assembly of the first and the second interlocking split members. The central aperture is sized and configured to be proximally positionable around at least one of the conduit and sized smaller than the flanged conduit end. Each of the first and second interlocking split members further comprises two interlocking split member interlocking edges with a minimum spaced apart distance about equal to dimension of the central aperture and symmetrically configured around a symmetry axis. At least one of the first and second interlocking split members has at least two fastening apertures sized to permit means for fastening to fit therethrough such as for example bolts and each of the fastening apertures are centrally located on the second symmetry axis and substantially equally distanced from the first symmetry axis. At least one of the first and second interlocking split members has affixed thereto, an interlocking portion. The interlocking portion has an inner edge and a first and a second interlocking edge. The interlocking portion is affixed such that the interlocking portion, when the two interlocking split members are assembled, interfits between the interlocking edges of the second interlocking split member. Whereby the interlocking assembly of the first interlocking split member and the second interlocking split member creates interlocking split flange connector having the central aperture and the fastening apertures.

It is a further object of the present invention to provide the interlocking split flange connector wherein the at least one interlocking portion is affixed in position symmetric about either the first symmetry axis or the second symmetry axis. Where the interlocking portion is symmetric about the second symmetry axis, each of the interlocking split members will have a one fastening aperture but when the two interlocking split members are assembled, the interlocking split flange connector resulting therefrom will have one fastening aperture at each end and on the second symmetry axis.

It is a further object of the present invention to provide an interlocking split flange connector for attaching two conduit at attachable and mateable flanged conduit ends comprising a first interlocking split member and a second interlocking split member, each of the first and second interlocking split members having; a symmetry axis, an inner wall means defining substantially about one half of a perimeter of a central aperture. The central aperture is formed upon interlocking assembly of the first and the second interlocking split members. The central aperture is sized and configured to be proximally positionable around at least one of the conduit and sized smaller than the flanged conduit end. Each of the first and second interlocking split members further comprises two interlocking split member interlocking edges with a minimum spaced apart distance about equal to dimension of the central aperture and symmetrically configured around the symmetry axis. Each of the interlocking split members has three fastening apertures sized to permit means for fastening to fit therethrough. Each of the three fastening apertures are separated by 120° from the others on radial lines with the origin of each of the radial lines at center of the central aperture. At least one of the interlocking split members has affixed thereto, an interlocking portion. The interlocking portion has an inner edge and a first and a second interlocking edge. The interlocking portion is affixed such that the interlocking portion, when the two interlocking split members are assembled, interfits between the interlocking edges of the second interlocking split member. Whereby the interlocking assembly of the first interlocking split member and the second interlocking split member creates the interlocking split flange connector having the central aperture and the three fastening apertures.

These and further objects of the present invention will become apparent to those skilled in the art to which this invention pertains and after a study of the present disclosure of the invention.

BRIEF DESCRIPTION OF THE DRAWINGS

FIG. 5 is a perspective schematic illustration of the disassembled interlocking split flange connector illustrating the relationships of the interlocking portion and the apertures;

FIG. 6 is a bottom plan view of the disassembled alternate embodiment of the interlocking split flange connector illustrating the first interlocking split member showing, in shadow, the interlocking portion attached thereto;

FIG. 7 is a top plan view of the non-identical second embodiment of the interlocking split member;

FIG. 12 is a perspective schematic illustration of the second embodiment of the disassembled interlocking split flange connector illustrating the relationships of the interlocking portion and the apertures;

FIG. 13 is a top plan view of a third embodiment of the invention illustrating the first and the second identical members, the cut-out lines for the removed portion shown in shadow;

FIG. 14 is a top plan view of the first and the second identical members with the interlocking portion removed therefrom;

FIG. 15 is a top plan view of the removed portion;

FIG. 16 is a top plan view of the first interlocking split member and the second identical interlocking split members showing the interlocking portion attached thereto;

FIG. 17 is a perspective schematic illustration of the third embodiment of the disassembled interlocking split flange connector illustrating the relationships of the interlocking portion and the apertures.

DESCRIPTION OF THE PREFERRED EMBODIMENTS

Figure 3:
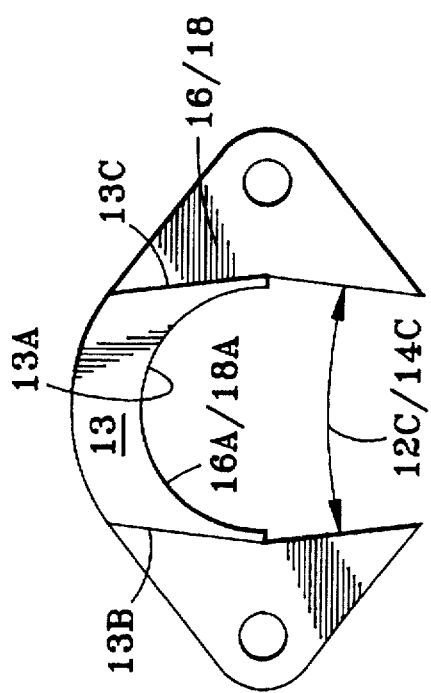
FIG. 3 is a top plan view of the first interlocking split member and the second identical interlocking split members showing the interlocking portion attached thereto.
Figure 4:
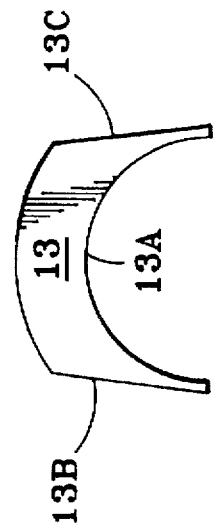
FIG. 4 is a top plan view of the interlocking portion.

The following is a description of the preferred embodiments of the invention. It is clear that there may be variations in the size and the shape of the interlocking split flange connector, in the materials used in the construction and in the orientation and the number of fastening apertures. It is also clear that the connector and the basic features of the connector may be used to attach conduit of forms other than circular pipe in flow connection. Certainly rectangular, elliptical or other geometric forms of conduit could be connected using the basic features of the invention disclosed and claimed. In the preferred embodiment of the invention, the two interlocking split members are substantially identical in size, shape and material. It is certainly possible to have an interlocking split flange connector in which one of the two interlocking split members does not have either one or both fastening apertures, typically bolt holes, but does interlock with the member with bolt holes to effectively, in conjunction with a mating connector element or another interlocking split flange connector, bring together two flanged pipes in secure flow communication.

In order to best disclose the features and the advantages of the invention, the exhaust system pipes of a typical vehicle is the application of use for the connector which will be most directly discussed.

FIGS. 1–5 disloses in a somewhat sequential way the development of interlocking split flange connector 10 having two fastening apertures 11C and a central aperture 11 defined by wall 11A. As can be seen in FIG. 5, interlocking split flange connector 10 is comprised of two substantially identical interlocking split members 16 and 18. To create connector 10, first interlocking split flange member 16 is placed with attached interlocking portion 13 facing out. Second interlocking split flange member 18 is placed with attached interlocking portion 13 facing in. The two members 16 and 18 interfit in such a manner as to create central aperture 11 and fastening apertures 11C. Interlocking portion inner edge 13A alignes with first split member inner wall 16A and second split member inner wall 18A creating, in combination, central aperture wall 11A with a dimension 11B (for a circle a diameter D) of a size large enough to fit around a first pipe being connected to a second pipe. The two members 16 and 18 interlock because attached interlocking portion edges 13B and 13C on member 16 fit within two second split member interlocking edges 14C on member 18. Similarly, attached interlocking portion edges 13B and 13C on member 18 fit within two second split member interlocking edges 12C on member 16. The combination of first split member inner edge 12B and interlocking portion inner edge 13A combine to form one-half of central aperture wall 16A and the combination of second split member inner edge 14B and interlocking portion inner edge 13A combine to form the remaining one-half of central aperture wall 18A.

Figure 1:
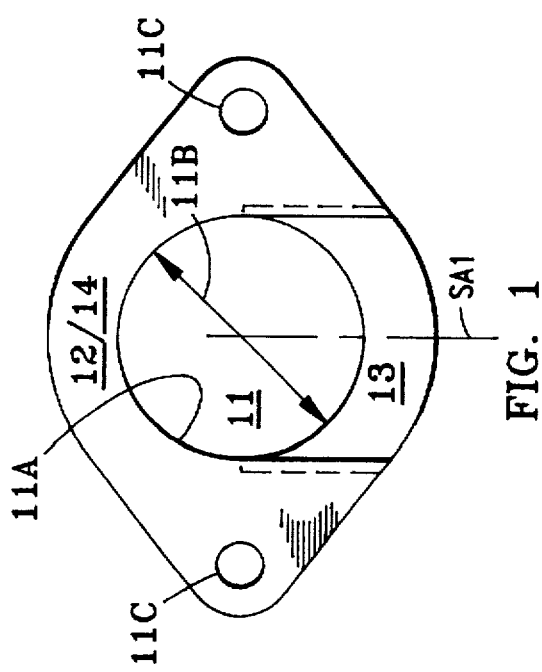
FIG. 1 is a top plan view of a first embodiment of the invention illustrating the first and the second identical members, the cut-out lines for the removed portion shown in shadow.
Figure 2:
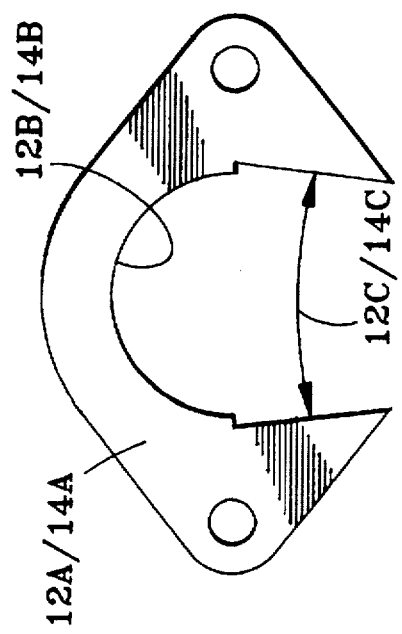
FIG. 2 is a top plan view of the first and the second identical members with the interlocking portion removed therefrom.

FIG. 1 illustrates each one of two identical members, first member 12 and second member 14. There is centrally located, at the intersection of symmetry axis SA1 and symmetry axis SA2, central aperture 11 having a dimension 11B which is a diameter D for the instance of a circular aperture 11. There is shown in shadow, the lines on which a cut will remove a portion of first member 12 or second 14, which removed portion becomes interlocking portion 13. With interlocking portion 13 removed first member 12 or second member 14 becomes first and second split member 12A and 14A respectively. Interlocking portion 13 is affixed to each split member 12A and 14A with interlocking portion inner edge 13A aligned with each of first split member inner edge 14A and second split member inner edge 14B. Thus, two identical interlocking split members, first interlocking split member 16 and second interlocking split member 18.

FIGS. 6 and 7 taken together, illustrates one possible interlocking flange connector 40 where the two interlocking split members are not identical. The first interlocking member 16 is the same as described above. The second interlocking split member 48 does not have fastening apertures and could be made from a circular washer for example. Second split member interlocking edges 48C and second split member inner edge 48A are substantially the same as edges 14C and 18A respectively.

FIGS. 8–12 disclose in a somewhat sequential way the development of interlocking split flange connector 20 having two fastening apertures 11C and a central aperture 11 defined by wall 11A.

As can be seen in FIG. 12, interlocking split flange connector 20 is comprised of two substantially identical interlocking split members 26 and 28. To create connector 20, first interlocking split flange member 26 is placed with attached interlocking portion 23 facing out or up. Second interlocking split flange member 28 is placed with attached interlocking portion 23 facing in or down. The two members 26 and 28 interfit in such a manner as to create central aperture 11 and fastening apertures 11C. Interlocking portion inner edge 23A alignes with first split member inner wall 26A and second split member inner wall 28A creating, in combination, central aperture wall 11A with a dimension 11B (for a circle a diameter D) of a size large enough to fit around a first pipe being connected to a second pipe. The two members 26 and 28 interlock because attached interlocking portion edges 23B and 23C on member 26 fits within two second split member interlocking edges 24C on member 28. Similarly, attached interlocking portion edges 23B and 23C on member 28 fits within two second split member interlocking edges 22C on member 26. The combination of first split member inner edge 22B and interlocking portion inner edge 23A combine to form one-half of central aperture wall 26A and the combination of second split member inner edge 24B and interlocking portion inner edge 23A combine to form the remaining one-half of central aperture wall 28A.

Figure 11:
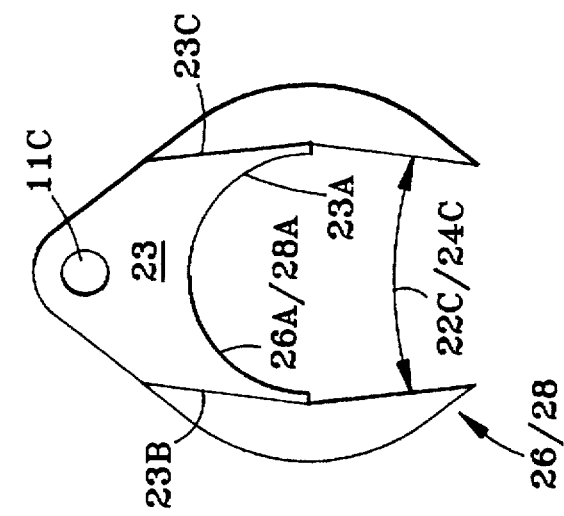
FIG. 11 is a top plan view of the first interlocking split member and the second identical interlocking split members showing the interlocking portion attached thereto.
Figure 9:
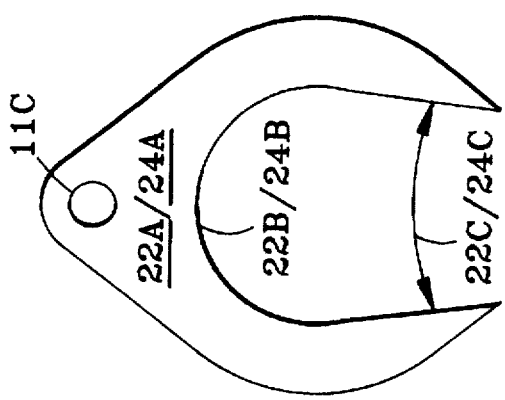
FIG. 9 is a top plan view of the first and the second identical members with the interlocking portion removed therefrom.
Figure 10:
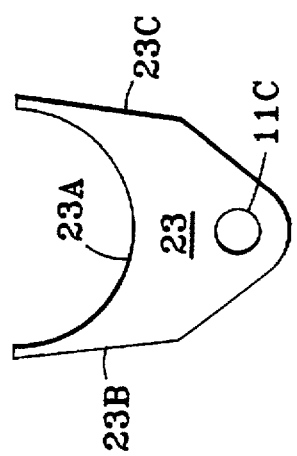
FIG. 10 is a top plan view of the interlocking portion.
Figure 8:
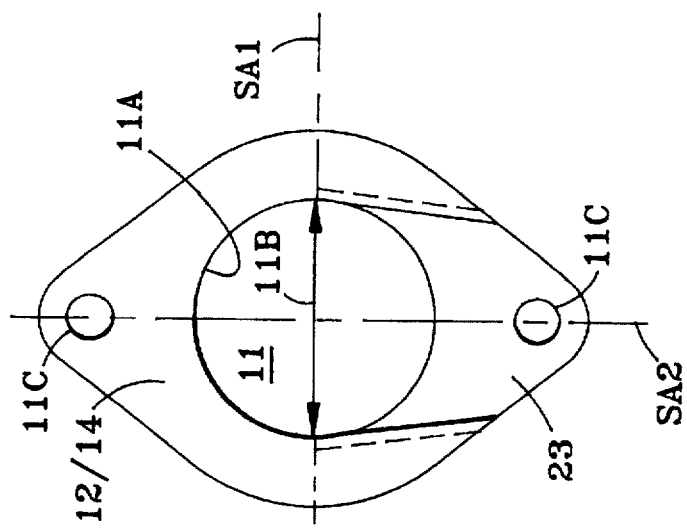
FIG. 8 is a top plan view of a second embodiment of the invention illustrating the first and the second identical members, the cut-out lines for the removed portion shown in shadow.

FIG. 8 illustrates each one of two identical members, first member 12 and second member 14. There is centrally located, at the intersection of symmetry axis SA1 and symmetry axis SA2, central aperture 11 having a dimension 11B which is a diameter D for the instance of a circular aperture 11. There is shown in shadow, the lines on which a cut will remove a portion of first member 12 or second 14, which removed portion becomes interlocking portion 23 (see FIG. 10). With reference to FIG. 9, with interlocking portion 23 removed first member 12 or second member 14 becomes first and second split member 22A and 24A respectively. Interlocking portion 23 may be affixed to each split member 22A and 24A with interlocking portion inner edge 23A aligned with each of first split member inner edge 22B and second split member inner edge 24B thus forming two identical interlocking split members, first interlocking split member 26 and second interlocking split member 28 as shown in FIG. 11. It is clear that interlocking split flange connector 20 has the interlocking portion 23 cut out symmetrically around symmetry axis SA2. Thus, interlocking portion 23 has a fastening aperture 11C contained within portion 23. When portion 23 is positioned onto both first and second split members 22A and 22B respectively, fastening aperture 11C on portion 23 will align with fastening aperture 11C on split member 22A and 22B. For connector 20 it is not essential to affix portion 23 to split members 22A and 22B because when a fastener such as a bolt is used for connecting pipe together, portion 23 will be held onto each split member 22A and 22B.

FIGS. 13-17 disclose in a somewhat sequential way the development of interlocking split flange connector 30 having three fastening apertures 11C and a central aperture 11 defined by wall 11A.

AS can be seen in FIGS. 16 and 17, interlocking split flange connector 30 is comprised of two substantially identical interlocking split members 36 and 38. To create connector 30, first interlocking split flange member 36 is placed with attached modified interlocking portion 33' facing out or up. Second interlocking split flange member 38 is placed with attached modified interlocking portion 33' facing in or down. Note that modified interlocking portion 33' is formed by the removal of portion 33" shown in shadow in FIG. 16. The two members 36 and 38 interfit in such a manner as to create central aperture 11 and three fastening apertures 11C. Interlocking portion inner edge 33A alignes with first split member inner wall 36A and second split member inner wall 38A creating, in combination, central aperture wall 11A with a dimension 11B (for a circle a diameter D) of a size large enough to fit around a first pipe being connected to a second pipe. The two members 36 and 38 interlock because attached interlocking portion edges 33B and 33C on member 36 fits within two second split member interlocking edges 34C on member 38. Similarly, attached interlocking portion edges 33B and 33C on member 38 fits within two second split member interlocking edges 32C on member 36. The combination of first split member inner edge 32B and interlocking portion inner edge 33A combine to form one-half of central aperture wall 36A and the combination of second split member inner edge 34B and interlocking portion inner edge 33A combine to form the remaining one-half of central aperture wall 38A.

FIG. 13 illustrates each one of two identical members, first member 32 and second member 34. There is centrally located, at the intersection of three identical symmetry axes each identified as SA. Central aperture 11 has a dimension 11B which is a diameter D for the instance of a circular aperture 11. There is shown in shadow, the lines on which a cut will remove a portion of first member 32 or second 34, which removed portion becomes interlocking portion 33 (see FIG. 15). With reference to FIG. 14, with interlocking portion 33 removed, first member 32 or second member 34 becomes first and second split member 32A and 34A respectively. Modified interlocking portion 33' is affixed to each split member 32A and 34A with interlocking portion inner edge 33A aligned with each of first split member inner edge 32B and second split member inner edge 34B thus forming two identical interlocking split members, first interlocking split member 36 and second interlocking split member 38 as shown in FIG. 16. It is clear that interlocking split flange connector 30 has the interlocking portion 33 cut out symmetrically around any one of the three symmetry axes SA. When portion 33' is positioned onto both first and second split members 32A and 34A respectively, it is clear that they are positioned symmetrically onto either of, but the same one of the remaining symmetry axes SA.

Figure 18:
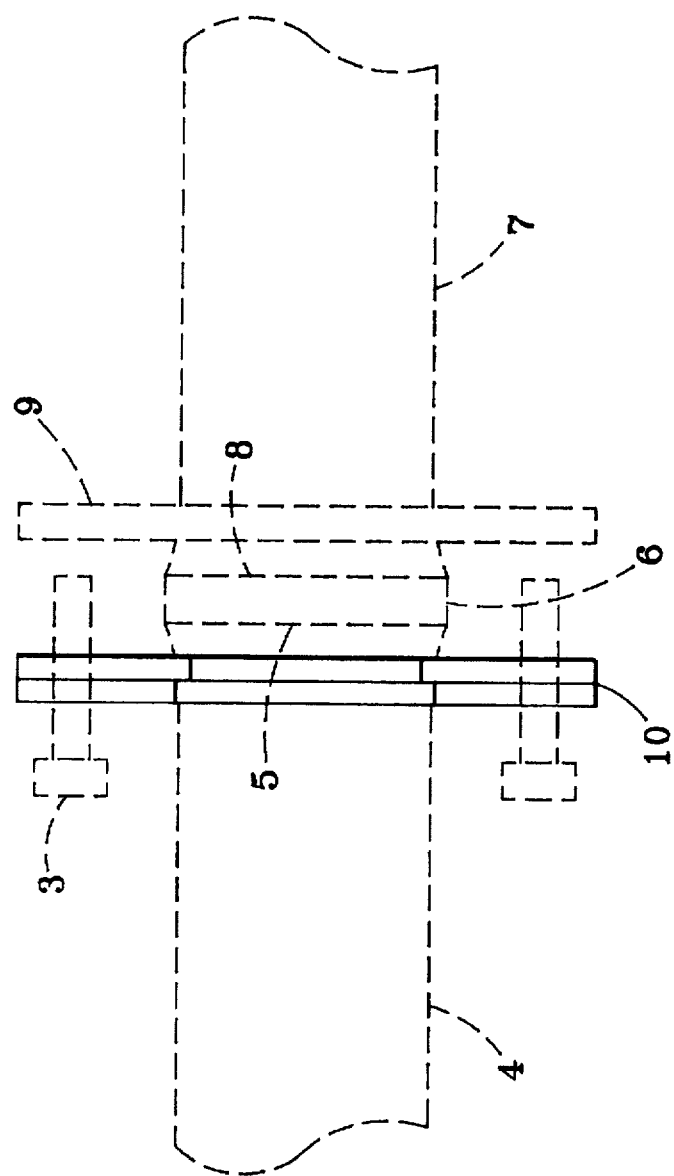
FIG. 18 is a illustration of the manner of use of the interlocking split flange connector.

FIG. 18 illustrates the manner of use of at least one interlocking split flange connector 10, 20, 30 or 40. All of the elements are shown in shadow except for connector 10. Connector 10 is positioned around first pipe 4. Connector 10 is brought against first pipe flange end 5. There may be gasket member 6 which provides a flow-tight fit between first pipe flange end 5 and second pipe flange end 8. If there is a mating connector element 9 already positioned around second pipe 7, bolts 3 and corresponding nuts are used to draw connector 10 toward mating connector element 9 thereby causing the two pipes to come into flow connection. In the event there is no mating connector element 9, a second interlocking split flange connector 10 or 20 may be used. Clearly, three hole connector 30 could also be used if mating connector element 9 was a three hole clamp or if there was no mating connector present and a second connector 30 is used.

It is thought that the present invention, the interlocking split flange connector is understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

What is claimed is:

1. An interlocking split flange connector for attaching two conduit at attachable and mateable flanged conduit ends comprising:

a first interlocking split member and a second interlocking split member, each said first and second interlocking split members comprising:

a first symmetry axis and a second symmetry axis perpendicular to said first symmetry axis;

an inner wall means defining substantially about one half of a perimeter of a central aperture, said central aperture formed upon interlocking assembly of each said first and second interlocking split members, said central aperture sized and configured to be proximally positionable around at least one of said conduit and sized smaller than said mateable flanged conduit ends;

two interlocking split member interlocking edges with a minimum spaced apart distance about equal to dimension of said central aperture and symmetrically configured around a symmetry axis;

at least one of said first and second interlocking split members having at least two fastening apertures, each of said at least two fastening apertures centrally located on said second symmetry axis and substantially equally distanced from said first symmetry axis;

at least one of said first and said second interlocking split members having affixed thereto, an interlocking portion, said interlocking portion having an inner edge and a first and a second interlocking edge, said at least one interlocking portion affixed such that said interlocking portion, when said two interlocking split members are assembled, interfits between said interlocking edges of said second interlocking split member; and whereby said interlocking assembly of said first interlocking split member and said second interlocking split member creating said interlocking split flange connector having said central aperture and said fastening apertures.

2. The interlocking split flange connector according to claim 1 wherein said at least one interlocking portion is affixed in position symmetric about said first symmetry axis.

3. The interlocking split flange connector according to claim 1 wherein each said first and second interlocking split members have affixed thereto, said interlocking portion, each said interlocking portion affixed in position symmetric about said first symmetry axis.

4. The interlocking split flange connector according to claim 3 wherein each said first and second interlocking split members have at least two fastening apertures.

5. An interlocking split flange connector for attaching two conduit at attachable and mateable flanged conduit ends comprising:

a first interlocking split member and a second interlocking split member, each said first and second interlocking split members comprising:

a first symmetry axis and a second symmetry axis perpendicular to said first symmetry axis;

an inner wall means defining substantially about one half of a perimeter of a central aperture, said central aperture formed upon interlocking assembly of each said first and second interlocking split members, said central aperture sized and configured to be proximally positionable around at least one of said conduit and sized smaller than said mateable flanged conduit ends;

two interlocking split member interlocking edges with a minimum spaced apart distance about equal to dimension of said central aperture and symmetrically configured around said second symmetry axis;

each said first and second interlocking split members having one fastening aperture, said one fastening aperture centrally located on said second symmetry axis and distanced from said first symmetry axis;

at least one of said first and second interlocking split members having affixed thereto, an interlocking portion, said interlocking portion having a fastening aperture, an inner edge and a first and a second interlocking edge, said at least one interlocking portion affixed such that said interlocking portion, when said two interlocking split members are assembled, interfits between said interlocking edges of said second interlocking split member; and whereby said interlocking assembly of said first interlocking split member and said second interlocking split member creating said interlocking split flange connector having said central aperture and said fastening apertures.

6. The interlocking split flange connector according to claim 5 wherein said at least one interlocking portion is affixed in position symmetric about said second symmetry axis.

7. The interlocking split flange connector according to claim 5 wherein each said first and second interlocking split members have affixed thereto, said interlocking portion, each said interlocking portion affixed in position symmetric about said second symmetry axis.

8. The interlocking split flange connector according to claim 7 wherein each said first and second interlocking split members have at least two fastening apertures.

9. An interlocking split flange connector for attaching two conduit at attachable and mateable flanged conduit ends comprising:

a first interlocking split member and a second interlocking split member, each said first and second interlocking split members comprising:

a symmetry axis;

an inner wall means defining substantially about one half of a perimeter of a central aperture, said central aperture formed upon interlocking assembly of each said first and second interlocking split members, said central aperture sized and configured to be proximally positionable around at least one of said conduit and sized smaller than said mateable flanged conduit ends;

two interlocking split member interlocking edges with a minimum spaced apart distance about equal to dimension of said central aperture and symmetrically configured around said symmetry axis;

each said first and second interlocking split members having three fastening apertures, each said three fastening apertures separated by 120 (degrees) from the others on radial lines with origin at center of said central aperture;

at least one of said first and said second interlocking split members having affixed thereto, an interlocking portion, said interlocking portion having an inner edge and a first and a second interlocking edge, said at least one interlocking portion affixed such that said interlocking portion, when said two interlocking split members are assembled, interfits between said interlocking edges of said second interlocking split member; and whereby said interlocking assembly of said first interlocking split member and said second interlocking split member creating said interlocking split flange connector having said central aperture and said three fastening apertures.

10. The interlocking split flange connector according to claim 9 wherein said at least one interlocking portion is affixed in position symmetric about said symmetry axis.

11. The interlocking split flange connector according to claim 9 wherein each said first and second interlocking split members have affixed thereto, said interlocking portion, each said interlocking portion affixed in position symmetric about said symmetry axis.

* * * * *